US012558666B1

(12) United States Patent
Omran et al.

(10) Patent No.: US 12,558,666 B1
(45) Date of Patent: Feb. 24, 2026

(54) REMOVAL OF WATER POLLUTANT USING CALCIUM METAVANADATE/CALCIUM SILICATE/GRAPHITE-PHASE CARBON NITRIDE (CaV$_2$O$_6$/CaSiO$_3$/g-C$_3$N$_4$) NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/266,138

(22) Filed: Jul. 10, 2025

(51) Int. Cl.
| | |
|---|---|
| *B01J 20/10* | (2006.01) |
| *B01J 20/06* | (2006.01) |
| *B01J 20/28* | (2006.01) |
| *B01J 20/30* | (2006.01) |
| *C02F 1/28* | (2023.01) |
| *C02F 101/30* | (2006.01) |

(52) U.S. Cl.
CPC .............. *B01J 20/10* (2013.01); *B01J 20/06* (2013.01); *B01J 20/28007* (2013.01); *B01J 20/28059* (2013.01); *B01J 20/28071* (2013.01); *B01J 20/28083* (2013.01); *B01J 20/3078* (2013.01); *C02F 1/288* (2013.01); *C02F 1/281* (2013.01); *C02F 2101/308* (2013.01)

(58) Field of Classification Search
None
See application file for complete search history.

(56) References Cited

U.S. PATENT DOCUMENTS

2008/0305027 A1 12/2008 Johnston et al.

OTHER PUBLICATIONS

Maryam Karami, et.al., "Green fabrication of graphene quantum dots from cotton with CaSiO3 nanostructure and enhanced photocatalytic performance for water treatment", International Journal of Hydrogen Energy, vol. 47, Issue 11, Feb. 5, 2022, pp. 7228-7241 (6 pages; excerpts).
Yu Yang, et.al., "Improved purification efficiency and stability of photocatalytic cement-based pavement coated with colloidal graphitic carbon nitride", Surfaces and Interfaces, vol. 53, Oct. 2024, 105040 (6 pages; excerpts).
I. Neelakanta Reddy, et.al., "Vanadium-doped graphitic carbon nitride for multifunctional applications: Photoelectrochemical water splitting and antibacterial activities", Chemosphere, vol. 264, Part 2, Oct. 10, 2020, 128593 (8 pages; excerpts).

*Primary Examiner* — Kara M Peo
(74) *Attorney, Agent, or Firm* — Oblon, McClelland, Maier & Neustadt, L.L.P.

(57) ABSTRACT

A method of removing a pollutant from water includes contacting a CaV$_2$O$_6$/CaSiO$_3$/g-C$_3$N$_4$ nanocomposite with a solution comprising one or more pollutants. The CaV$_2$O$_6$/CaSiO$_3$/g-C$_3$N$_4$ nanocomposite includes a graphite-phase carbon nitride (g-C$_3$N$_4$) in an amount of 20 to 40 percent by weight (wt. %), calcium silicate (CaSiO$_3$) in an amount of 20 to 40 wt. %, and calcium metavanadate (CaV$_2$O$_6$) in an amount of 20 to 40 wt. %, based on a total weight of the CaV$_2$O$_6$/CaSiO$_3$/g-C$_3$N$_4$ nanocomposite.

20 Claims, 6 Drawing Sheets

1

REMOVAL OF WATER POLLUTANT USING CALCIUM METAVANADATE/CALCIUM SILICATE/GRAPHITE-PHASE CARBON NITRIDE (CaV$_2$O$_6$/CaSiO$_3$/g-C$_3$N$_4$) NANOCOMPOSITE

BACKGROUND

Technical Field

The present disclosure is directed to a method of removing a pollutant from water using a nanocomposite, more particularly, to a method of removing a pollutant from water using a nanocomposite including graphite-phase carbon nitride (g-C$_3$N$_4$), calcium silicate (CaSiO$_3$), and calcium metavanadate (CaV$_2$O$_6$).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wastewater production has increased as a result of the ongoing expansion industrial sector. Because dyes are widely used in the food, cosmetics, textile, leather, and packaging industries, they are frequently discovered in wastewater. Significant mutagenesis and carcinogenic effects are shown by synthetic dyes [Farnum, J. L. Examining the Effects of Synthetic Dye Yellow No. 5 (Tartrazine) Exposure on Mouse Neuro2A Neurons In Vitro. Bachelor's Thesis, University of Central Florida, Orlando, FL, USA, 2022.]. In order to avoid any health issues and environmental damage, colors in wastewater must be cleaned up before being released into the environment. The removal of dyes from industrial effluent has been studied for many years. Various technological procedures, such as oxidation, adsorption, or filtration, can be used to decolorize water [Shindhal, T.; Rakholiya, P.; Varjani, S.; Pandey, A.; Ngo, H. H.; Guo, W.; Ng, H. Y.; Taherzadeh, M. J. A critical review on advances in the practices and perspectives for the treatment of dye industry wastewater. Bioengineered, 2021, 12, 70-87.]. One of the effective methods for removing dye from water is adsorption. Thus, adsorption onto zeolite, charcoal, sand, agricultural wastes, activated carbon, and slag has been used to alienate pigments, and the adsorption isotherm has been suitably investigated. Heavy metal pollution results from human anthropogenic activities, including chemicals, textile, leather, plastic industries, mining activities, batteries industry, paints and pigments, and paper and pulp productions. Releasing these toxic metals into effluents and water streams without treatment poses an immense threat to biota. Through the food chains, they can reach living organisms and pose a risk of instigating severe ailments, such as cancer, nervous system damage, and kidney failures, and can ultimately be fatal at high levels. In the quest for a remediation process, numerous standard methods, including ion exchange, precipitation, coagulation, membrane filtration, reverse osmosis, and adsorption techniques, have been employed for the riddance of toxic metal ions. Among these approaches, adsorption methods are highly favored for extraordinary exclusion competence for extremely low ions within trace amounts at a low price and simplicity relative to classical techniques. Elements such as cadmium (Cd), chromium (Cr), copper (Cu), iron (Fe), lead (Pb), nickel (Ni), silver (Ag), zinc (Zn), and uranium (U) are the most common heavy metals in ionic forms in industrial water runoff. Nevertheless, copper generally exists at high levels in wastewater as the most cherished and universally utilized metal in various engineering applications, e.g., metal finishing, electroplating, and etching. The varied properties of graphite-phase carbon nitride (g-C$_3$N$_4$), a metal-free n-type semiconductor that is inexpensive, thermally and chemically robust, visible light responsive, safe, and simple to manufacture, have garnered a lot of attention recently [Singh, D.; Gautam, R. K.; Kumar, R.;

Shukla, B. K.; Shankar, V.; Krishna, V. Citric acid coated magnetic nanoparticles: synthesis, characterization and application in removal of Cd (II) ions from aqueous solution. Journal of Water Process Engineering, 2014, 4,233-241.]. Its limited specific surface area, rapid electron-hole pair recombination, and challenging exfoliation are its most prevalent disadvantages. Heteroatom doping and microstructure design modification are used to get over these drawbacks.

As a result, adding metal nanoparticles to g-C$_3$N$_4$ nanosheets can prevent them from wrapping, maintaining a larger specific surface area and increased adsorption capacity. Several works described metal oxides as pore volume and average pore size improvers [Sharma, D.; Saini, A.; Choudhary, D.; Kumari, M.; Chaudhary, A.; Dhayal, V. In-situ synthesis of ZnO modified g-C$_3$N$_4$ composite: a potential photocatalyst and adsorbent for waste water remediation. Materials research innovations, 2022, 26 (2), 65-75.; and Li, D.; Liu, Y.; Liu, Z.; Yang, J.; Hu, C.; Feng, L. Electrochemical hydrogen evolution reaction efficiently catalyzed by Ru-N coupling in defect-rich Ru/gC3N$_4$ nanosheets. Journal of Materials Chemistry A, 2021. 9 (26), 15019-15026.]. For example, MgY$_2$O$_4$-g-C$_3$N$_4$, Ox-g-C$_3$N$_4$/Pani-NF, and CoFe204-g-C$_3$N$_4$ were used to exclude copper ions, whereas CdS/g-C$_3$N$_4$, Y$_2$O$_3$@g-C$_3$N$_4$, and ZnO-g-C$_3$N$_4$ were used to exclude cadmium ions.

Although multicomponent nanocomposite-based materials have been described in the past, there still exists a need to develop nanocomposites with improved properties. Accordingly, it is one object of the present disclosure to provide a multicomponent nanocomposite by integrating metal borates, oxides, and carbon nanomaterials to enhance the properties and their synergistic effect, making them ideal for applications in energy storage, catalysis, biomedicine, and environmental sustainability.

SUMMARY

In an exemplary embodiment, a method of removing a pollutant from water using a nanocomposite is described. The method includes contacting a CaV$_2$O$_6$/CaSiO$_3$/g-C$_3$N$_4$ nanocomposite with a solution comprising one or more pollutants. The CaV$_2$O$_6$/CaSiO$_3$/g-C$_3$N$_4$ nanocomposite includes a graphite-phase carbon nitride (g-C$_3$N$_4$) in an amount of 20 to 40 percent by weight (wt. %), calcium silicate (CaSiO$_3$) in an amount of 20 to 40 wt. %, and calcium metavanadate (CaV$_2$O$_6$) in an amount of 20 to 40 wt. %, based on a total weight of the CaV$_2$O$_6$/CaSiO$_3$/g-C$_3$N$_4$ nanocomposite.

In some embodiments, the CaV$_2$O$_6$/CaSiO$_3$/g-C$_3$N$_4$ nanocomposite is porous, and has a slit-shaped pores.

In some embodiments, the CaV$_2$O$_6$/CaSiO$_3$/g-C$_3$N$_4$ nanocomposite has a pore diameter of 3 to 15 nanometers (nm).

In some embodiments, the CaV$_2$O$_6$/CaSiO$_3$/g-C$_3$N$_4$ nanocomposite has a pore volume of 0.2 to 0.25 cubic centimeters per gram (cm$^3$g$^{-1}$).

In some embodiments, the $CaV_2O_6/CaSiO_3/g\text{-}C_3N_4$ nanocomposite has a Brunauer-Emmett-Teller (BET) surface area of 50 to 65 square meters per gram ($m^2g^{-1}$).

In some embodiments, one or more pollutants are accommodated on the surface or in the pores or both on the surface and in the pores of the nanocomposite after contacting the $CaV_2O_6/CaSiO_3/g\text{-}C_3N_4$ nanocomposite with the solution comprising one or more pollutants.

In some embodiments, the $CaV_2O_6/CaSiO_3/g\text{-}C_3N_4$ nanocomposite has an adsorption capacity of 35 to 45 mg of the one or more pollutants per gram of the $CaV_2O_6/CaSiO_3/g\text{-}C_3N_4$ nanocomposite.

In some embodiments, the $CaV_2O_6/CaSiO_3/g\text{-}C_3N_4$ nanocomposite removes at least 18 mg of the one or more pollutants per gram of the nanocomposite from the solution within 3 minutes.

In some embodiments, the $CaV_2O_6/CaSiO_3/g\text{-}C_3N_4$ nanocomposite removes at least 25 mg of the one or more pollutants per gram of the nanocomposite from the solution within 5 minutes.

In some embodiments, the $CaV_2O_6/CaSiO_3/g\text{-}C_3N_4$ nanocomposite removes at least 27 mg of the one or more pollutants per gram of the nanocomposite from the solution within 10 minutes.

In some embodiments, the $CaV_2O_6/CaSiO_3/g\text{-}C_3N_4$ nanocomposite removes at least 30 mg of the one or more pollutants per gram of the nanocomposite from the solution within 20 minutes.

In some embodiments, the $CaV_2O_6/CaSiO_3/g\text{-}C_3N_4$ nanocomposite removes at least 33 mg of the one or more pollutants per gram of the nanocomposite from the solution within 30 minutes.

In some embodiments, the $CaV_2O_6/CaSiO_3/g\text{-}C_3N_4$ nanocomposite removes at least 35 mg of the one or more pollutants per gram of the nanocomposite from the solution within 45 minutes.

In some embodiments, the $CaV_2O_6/CaSiO_3/g\text{-}C_3N_4$ nanocomposite removes at least 38 mg of the one or more pollutants per gram of the nanocomposite from the solution within 60 minutes.

In some embodiments, the $CaV_2O_6/CaSiO_3/g\text{-}C_3N_4$ nanocomposite removes at least 40 mg of the one or more pollutants per gram of the nanocomposite from the solution within 90 minutes.

In some embodiments, the method of contacting the $CaV_2O_6/CaSiO_3/g\text{-}C_3N_4$ nanocomposite with the solution comprising one or more pollutants has a pseudo-second order kinetic model.

In some embodiments, the method of contacting the $CaV_2O_6/CaSiO_3/g\text{-}C_3N_4$ nanocomposite with the solution comprising one or more pollutants has a liquid-film diffusion model.

In some embodiments, the method of contacting the $CaV_2O_6/CaSiO_3/g\text{-}C_3N_4$ nanocomposite with the solution comprising one or more pollutants has an intraparticle diffusion model.

In some embodiments, the method of contacting the $CaV_2O_6/CaSiO_3/g\text{-}C_3N_4$ nanocomposite with the solution comprising one or more pollutants occurs for 1 to 2 hours. In some embodiments, the one or more pollutants is an organic pollutant.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
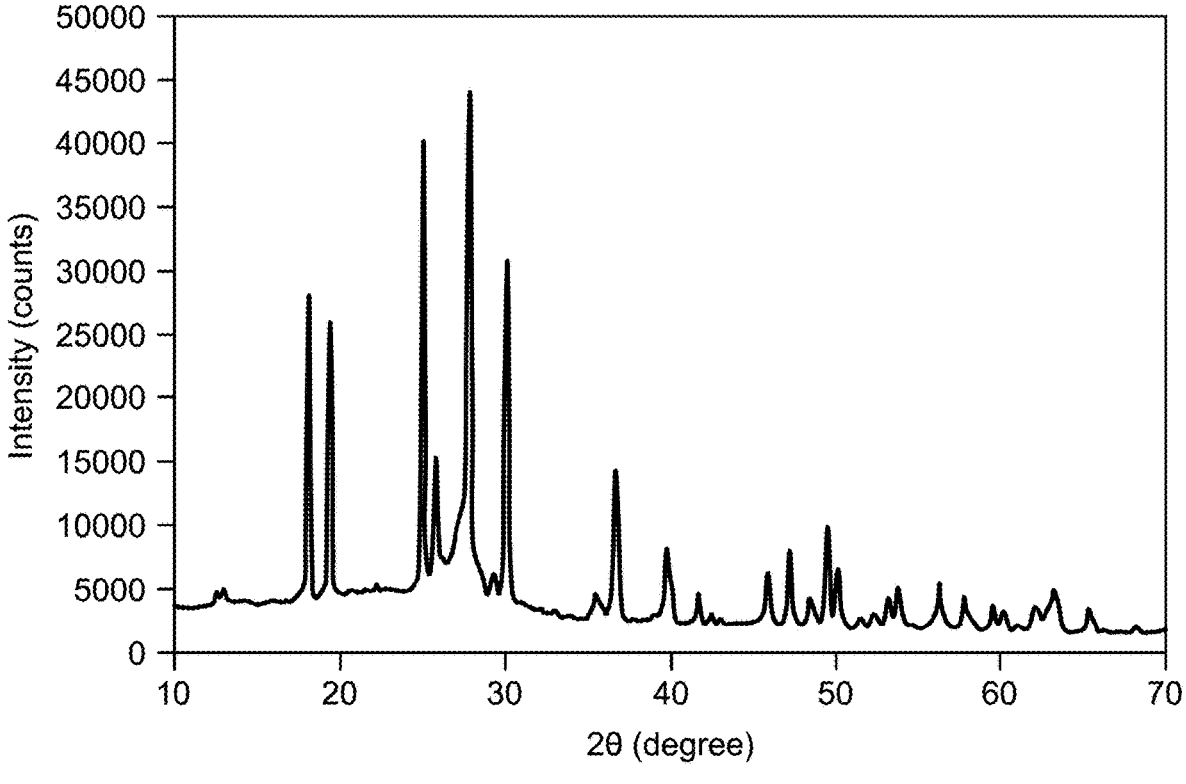
FIG. 1 shows X-ray diffractogram (XRD) of $CaV_2O_6/CaSiO_3/g\text{-}C_3N_4$ nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of '25 degrees Celsius (° C.)+3° C. in the present disclosure.

As used herein, the term 'nanomaterial' refers to materials with structural features at the nanoscale (1-100 nanometers (nm)) that exhibit unique physical, chemical, and mechanical properties compared to their bulk counterparts.

As used herein, the term 'nanocomposites' refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC), and/or any combination thereof. Nanocomposites may be used in various applications, including catalysis, environmental remediation, electronics, and materials science.

As used herein, the term 'crystalline' refers to a material or substance in which atoms, ions, or molecules are arranged in a highly ordered, repeating pattern extending in three dimensions. This regular atomic structure gives crystalline materials distinct properties, such as well-defined geometric shapes, sharp melting points, and characteristic optical and electrical behaviors.

As used herein, the term 'porosity' refers to a measure of the void or vacant spaces within a material.

As used herein, the term 'pore volume' refers to the total volume of the pores within a material. It is typically expressed in units of cubic centimeters per gram ($cm^3/g$) and indicates the capacity of the material to hold fluids or gases. High pore volume is particularly advantageous in applications like catalysis, adsorption, and gas storage, where large amounts of material are required to interact with the medium. A larger pore volume allows for more extensive surface interactions, improving the material's efficiency in these processes.

As used herein, the term 'pore diameter' refers to the average size of the pores in a material, typically measured in nanometers (nm) or micrometers (μm). It plays a key role in determining the material's behavior in specific applications. Pore size is often categorized into micropores (less than 2 nm), mesopores (2-50 nm), and macropores (greater than 50 nm). The pore diameter is often determined using methods such as nitrogen adsorption or mercury intrusion, which provide insights into the material's ability to absorb or interact with molecules of specific sizes.

As used herein, the term 'amount' refers to the proportion, or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%. The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include 13C and 14C. Isotopes of oxygen include 16O, 17O, and 18O. Isotopically labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'adsorption capacity' refers to the maximum amount of a substance that can be adsorbed onto the surface of a material, typically expressed in terms of weight or volume of adsorbate per unit mass or volume of the adsorbent. It is a measure of the material's ability to attract and hold molecules from a gas or liquid phase onto its surface, usually due to intermolecular forces such as van der Waals forces, hydrogen bonding, or electrostatic interactions.

As used herein, the term 'pollutants' refers to substances introduced into the environment that have undesired or even detrimental consequences. Pollutants can take various forms, including chemicals, particles, biological materials, or energy, that negatively affect the air, water, soil, or living organisms. These substances may arise from human activities, such as industrial processes, agricultural practices, and waste disposal, or from natural events like wildfires and volcanic eruptions. They tend to be harmful to the environment and living organisms, as they can be toxic, persistent, and bioaccumulate in ecosystems.

As used herein, the term 'organic pollutants' refers to carbon-based chemical compounds that persist in the environment, contaminate air, water, and soil, and pose serious health risks to humans and wildlife. These pollutants originate from industrial, agricultural, and domestic activities, with some being biodegradable while others persist for decades. Among organic pollutants, dyes, phenols, polycyclic aromatic hydrocarbons (PAHs), herbicides, pesticides, and persistent organic pollutants (POPs) are major contaminants, each with distinct sources and harmful effects.

A dye is a colored substance that chemically binds to a material it may be intended to color. Generally, a dye is applied in a solution, typically an aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin "s mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O—, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3—, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a] pyrene, corannulene, benzo[g,h,i] perylene, coronene, ovalene, benzo[c] fluorine, acenaphthene, acenaphthylene, benz [a] anthracene, benzo[b]fluoranthene, benzo[j] fluoranthene, benzo[k] fluoranthene, benzo[e] pyrene, cyclopenta [c,d]

pyrene, dibenz [a,h] anthracene, dibenzo[a,e] pyrene, dibenzo[a,h] pyrene, dibenzo[a,i] pyrene, dibenzo[a,1] pyrene, fluoranthene, fluorine, indeno[1,2,3-c,d] pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor,alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazol, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries, owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

As used herein, the term 'heavy metals' refers to metals that are naturally occurring metallic elements with high density and atomic weight, including lead (Pb), mercury (Hg), cadmium (Cd), arsenic (As), chromium (Cr), and nickel (Ni).

As used herein, the term 'water decontamination' refers to the process of removing harmful substances, pollutants, or microorganisms from water to make it safe for human use, environmental discharge, or other applications. This process can involve physical, chemical, or biological methods, including filtration, chemical treatment, or the use of advanced technologies like ultraviolet light or ozone treatment.

As used herein, the term 'contaminants' refer to the harmful substances or pollutants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

Aspects of this disclosure are directed to a method of removing a pollutant from water using $CaV_2O_6/CaSiO_3/g-C_3N_4$ nanocomposite is described. The method includes contacting a $CaV_2O_6/CaSiO_3/g-C_3N_4$ nanocomposite with a solution including one or more pollutants.

The $CaV_2O_6/CaSiO_3/g-C_3N_4$ nanocomposite comprises or consists of a graphite-phase carbon nitride ($g-C_3N_4$), calcium silicate ($CaSiO_3$), and calcium metavanadate ($CaV_2O_6$). When used in combination these components provide a synergistic effect that makes them ideal for applications in energy storage, catalysis, biomedicine, and environmental sustainability.

In some embodiments, the $CaV_2O_6/CaSiO_3/g-C_3N_4$ nanocomposite includes a graphite-phase carbon nitride ($g-C_3N_4$) in an amount of 20 to 40 percent by weight (wt. %), preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6/CaSiO_3/g-C_3N_4$ nanocomposite.

In some embodiments, the $CaV_2O_6/CaSiO_3/g-C_3N_4$ nanocomposite includes calcium silicate ($CaSiO_3$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6/CaSiO_3/g-C_3N_4$ nanocomposite.

In some embodiments, the $CaV_2O_6/CaSiO_3/g-C_3N_4$ nanocomposite includes calcium metavanadate ($CaV_2O_6$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6/CaSiO_3/g-C_3N_4$ nanocomposite. In a preferred embodiment, the $CaV_2O_6/CaSiO_3/g-C_3N_4$ nanocomposite includes an equal mass of $CaSiO_3$, $g-C_3N_4$, and V205, based on a total weight of the $CaV_2O_6/CaSiO_3/g-C_3N_4$ nanocomposite.

In some embodiments, the nanocomposite may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, and mixtures thereof. In a preferred embodiment, the $CaV_2O_6/CaSiO_3/g-C_3N_4$ nanocomposite is porous, and has slit-shaped pores. In a preferred embodiment, the two-dimensional porous structure of $CaV_2O_6/CaSiO_3/g-C_3N_4$ nanocomposite is constructed with curled and wrinkled nanosheets and platelets of the $g-C_3N_4$. In a preferred embodiment, the $CaV_2O_6/CaSiO_3/g-C_3N_4$ nanocomposite comprises or consists of homogeneous nanowires of metal oxides on nanosheets of $g-C_3N_4$.

In some embodiments, the homogeneous nanowires of metal oxides, on nanosheets of $g-C_3N_4$, has an average length in the range of from 50 to about 150 nm, preferably 55 to 145 nm, preferably 60 to 140 nm, preferably 65 to 135 nm, preferably 70 to 130 nm, preferably 75 to 125 nm, preferably 80 to 120 nm, preferably 85 to 125 nm, and preferably 90 to 120 nm, as determined using TEM. In a preferred embodiment, the homogeneous nanowires of metal oxides have an average length of 90.6 nm on nanosheets of $g-C_3N_4$, as determined using TEM.

The Brunauer-Emmett-Teller (BET) hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the $CaV_2O_6/CaSiO_3/g-C_3N_4$ nanocomposite has a Brunauer-Emmett-Teller (BET) surface area of 50 to 65 square meter per gram ($m^2g^{-1}$), preferably 50.5 to 64.5 $m^2g^{-1}$, preferably 51.0 to 64.0 $m^2g^{-1}$, preferably 51.5 to 63.5 $m^2g^{-1}$, preferably 52.0 to 63.0 $m^2g^{-1}$, preferably 52.5 to 62.5 $m^2g^{-1}$, preferably 53.0 to 62.0 $m^2g^{-1}$, preferably 53.5 to 61.5 $m^2g^{-1}$, preferably 54.0 to 61.0 $m^2g^{-1}$, preferably 54.5 to 60.5 $m^2g^{-1}$, preferably 55.0 to 60.0 $m^2g^{-1}$, preferably 55.5 to 59.5 $m^2g^{-1}$, preferably 56.0 to 59.0 $m^2g^{-1}$, preferably 56.5 to 58.5 $m^2g^{-1}$, and preferably 57.0 to 58.0 $m^2g^{-1}$. In a preferred embodiment, the $CaV_2O_6/CaSiO_3/g-C_3N_4$ nanocomposite has a Brunauer-Emmett-Teller (BET) surface area of 57.02 $m^2g^{-1}$.

In some embodiments, the average pore distribution of the nanocomposite, as determined by BJH desorption analysis, may include, but is not limited to, crystalline average pore distribution, bimodal, trimodal, multimodal, narrow, broad, and Gaussian. In a preferred embodiment, the crystalline nanocomposite has a multimodal pore size distribution, as determined by BJH desorption analysis. In some embodiments, the nanocomposite has a trimodal pore size distribution, as determined by BJH desorption analysis. The term "trimodal pore size distribution" refers to the material's pore structure in BET analysis. In a trimodal distribution, the porous materials contain significant populations of pores in three different size ranges. A porous material, with trimodal distribution, has pores of different sizes like micropores (approximately 1.5 nm), mesopores (2-50 nm) and macropores (greater than 50 nm). This type of pore structure enhances properties like adsorption, permeability, and diffusion, making it ideal for applications in catalysis, gas separation, and filtration. Micropores provide high surface area, mesopores allow molecule diffusion, and macropores facilitate bulk transport. Different pore sizes have the potential to target multiple contaminants or particles. Compared to unimodal or bimodal distributions, trimodal materials offer a wide variety performance associated with porosity, which is important for optimizing material functionality in various industrial and scientific applications.

In some embodiments, the $CaV_2O_6/CaSiO_3/g-C_3N_4$ nanocomposite has a pore diameter of 3 to 15 nm, preferably 3.1 to 14.9 nm, preferably 3.2 to 14.8 nm, preferably 3.3 to 14.7 nm, preferably 3.4 to 14.6 nm, preferably 3.5 to 14.5 nm, preferably 3.6 to 14.4 nm, and preferably 3.7 to 14.3 nm. In a preferred embodiment, the $CaV_2O_6/CaSiO_3/g-C_3N_4$ nanocomposite has a pore diameter maximized at 4.3 nm, 8.5 nm, and 14.27 nm.

In some embodiments, the $CaV_2O_6/CaSiO_3/g-C_3N_4$ nanocomposite has a pore volume of 0.2 to 0.25 cubic centimeters per gram ($cm^3g^{-1}$), preferably 0.205 to 0.245 $cm^3g^{-1}$, preferably 0.210 to 0.240 $cm^3g^{-1}$, preferably 0.215 to 0.235 $cm^3g^{-1}$, and preferably 0.220 to 0.230 $cm^3g^{-1}$. In a preferred embodiment, the $CaV_2O_6/CaSiO_3/g-C_3N_4$ nanocomposite has a pore volume of 0.22 $cm^3g^{-1}$.

In some embodiments, the nanocomposite has a hysteresis loop of Type H3 (international union of pure and applied chemistry (IUPAC) classification), as determined by $N_2$ adsorption-desorption analysis. In BET nitrogen adsorption-desorption analysis, hysteresis loops provide insight into the pore structure of materials. The H1 hysteresis loop is typically associated with materials having uniform, cylindrical mesopores, indicating a well-ordered and open porous structure. The H2 loop indicates the presence of complex pore geometries such as ink-bottle pores, where narrow necks are connected to wider cavities, often indicating pore blocking or restricted diffusion. The H3 hysteresis loop is common in materials composed of plate-like particles, such as layered or sheet-like structures, and reflects the presence of slit-shaped mesopores without pore filling at high relative pressures. Lastly, the H4 loop is similar to H3 but generally indicates narrower slit-like pores and often points to a combination of micro-and mesoporosity, commonly observed in more compact or disordered porous solids. In some embodiments, the nanocomposite may have a hysteresis loop of Type H4, H2, and H1.

In another aspect, a method of removing a pollutant from water is described. In some embodiments, the pollutant is an organic pollutant, which is at least one selected from a dye, a phenol, a polycyclic aromatic hydrocarbon, an herbicide, a pesticide, and a persistent organic pollutant. In some embodiments, the pollutant may be a heavy metal, which is at least one selected from the group consisting of lead, cadmium, arsenic, chromium, nickel, copper, and zinc.

The method includes contacting contaminated water with the nanocomposite and thereby forming a contaminated nanocomposite, and further collecting purified water by separating the water from the nanocomposite. Contaminated water refers to water contaminated with one or more contaminants or pollutants.

The contaminated water may include, but is not limited to, polluted river water, groundwater tainted with pesticides and fertilizers, sewage-contaminated water in urban areas, oil-spilled water in oceans, and lakes contaminated with industrial chemicals. Sources of the contaminated water may include, but are not limited to, industrial discharges, agricultural runoff containing pesticides and fertilizers, untreated sewage from urban areas, oil spills from ships and rigs, leachate from landfills, and chemical waste from factories. Additionally, mining activities, deforestation, and improper disposal of household chemicals also contribute to water contamination. In some embodiments, the contaminated nanocomposite is further recovered via chemical or thermal or biodegradation to remove contaminated pollutants from the nanocomposite.

In some embodiments, one or more pollutants are accommodated on the surface or in the pores or both on the surface and in the pores of the nanocomposite after contacting. In a preferred embodiment, the one or more pollutants is an organic pollutant.

In some embodiments, the $CaV_2O_6/CaSiO_3/g\text{-}C_3N_4$ nanocomposite has an adsorption capacity of 35 to 45 milligrams (mg), preferably 35.5 to 44.5 mg, preferably 36.0 to 44.0 mg, preferably 36.5 to 43.5 mg, preferably 37.0 to 43.0 mg, preferably 37.5 to 42.5 mg, preferably 38.0 to 42.0 mg, preferably 38.5 to 41.5 mg, and preferably 39.0 to 41.0 mg, of the one or more pollutants per gram of the $CaV_2O_6/CaSiO_3/g\text{-}C_3N_4$ nanocomposite. In a preferred embodiment, the $CaV_2O_6/CaSiO_3/g\text{-}C_3N_4$ nanocomposite has an adsorption capacity of 40.8 mg of the one or more pollutants per gram of the $CaV_2O_6/CaSiO_3/g\text{-}C_3N_4$ nanocomposite.

In some embodiments, the $CaV_2O_6/CaSiO_3/g\text{-}C_3N_4$ nanocomposite removes at least 18 mg of the one or more pollutants per gram of the $CaV_2O_6/CaSiO_3/g\text{-}C_3N_4$ nanocomposite, preferably at least 18.2 milligram per gram (mg/g), preferably at least 18.3 mg/g, preferably at least 18.4 mg/g, preferably at least 18.6 mg/g, and preferably at least 18.8 mg/g of the one or more pollutants per gram of the nanocomposite from the solution within 3 minutes.

In some embodiments, the $CaV_2O_6/CaSiO_3/g\text{-}C_3N_4$ nanocomposite removes at least 25 mg of the one or more pollutants per gram of the $CaV_2O_6/CaSiO_3/g\text{-}C_3N_4$ nanocomposite, preferably at least 25.1 mg/g, preferably at least 25.2 mg/g, preferably at least 25.3 mg/g, and preferably at least 25.4 mg/g of the one or more pollutants per gram of the nanocomposite from the solution within 5 minutes.

In some embodiments, the $CaV_2O_6/CaSiO_3/g\text{-}C_3N_4$ nanocomposite removes at least 27 mg of the one or more pollutants per gram of the $CaV_2O_6/CaSiO_3/g\text{-}C_3N_4$ nanocomposite, preferably at least 27.1 mg/g, preferably at least 27.2 mg/g, preferably at least 27.3 mg/g, preferably at least 27.4 mg/g of the one or more pollutants per gram of the nanocomposite from the solution within 10 minutes.

In some embodiments, the $CaV_2O_6/CaSiO_3/g\text{-}C_3N_4$ nanocomposite removes at least 30 mg of the one or more pollutants per gram of the $CaV_2O_6/CaSiO_3/g\text{-}C_3N_4$ nanocomposite, preferably at least 30.2 mg/g, preferably at least 30.4 mg/g, preferably at least 30.6 mg/g, preferably at least 30.8 mg/g, and preferably at least 31.0 mg/g of the one or more pollutants per gram of the nanocomposite from the solution within 20 minutes.

In some embodiments, the $CaV_2O_6/CaSiO_3/g\text{-}C_3N_4$ nanocomposite removes at least 33 mg of the one or more pollutants per gram of the $CaV_2O_6/CaSiO_3/g\text{-}C_3N_4$ nanocomposite, preferably at least 33.2 mg/g, preferably at least 33.4 mg/g, preferably at least 33.6 mg/g, and preferably at least 33.8 mg/g of the one or more pollutants per gram of the nanocomposite from the solution within 30 minutes.

In some embodiments, the $CaV_2O_6/CaSiO_3/g\text{-}C_3N_4$ nanocomposite removes at least 35 mg of the one or more pollutants per gram of the $CaV_2O_6/CaSiO_3/g\text{-}C_3N_4$ nanocomposite, preferably at least 35.2 mg/g, preferably at least 35.4 mg/g, preferably at least 35.6 mg/g, and preferably at least 35.8 mg/g of the one or more pollutants per gram of the nanocomposite from the solution within 45 minutes.

In some embodiments, the $CaV_2O_6/CaSiO_3/g\text{-}C_3N_4$ nanocomposite removes at least 38 mg of the one or more pollutants per gram of the $CaV_2O_6/CaSiO_3/g\text{-}C_3N_4$ nanocomposite, preferably at least 38.2 mg/g, preferably at least 38.4 mg/g, preferably at least 38.6 mg/g, and preferably at least 38.8 mg/g of the one or more pollutants per gram of the nanocomposite from the solution within 60 minutes.

In some embodiments, the $CaV_2O_6/CaSiO_3/g\text{-}C_3N_4$ nanocomposite removes at least 39 nm, preferably at least 40 mg of the one or more pollutants per gram of the nanocomposite from the solution within 90 minutes.

In some embodiments, the method of contacting the $CaV_2O_6/CaSiO_3/g\text{-}C_3N_4$ nanocomposite with the solution comprising one or more pollutants follows a pseudo-second order kinetic model.

In some embodiments, the method of contacting the $CaV_2O_6/CaSiO_3/g\text{-}C_3N_4$ nanocomposite with the solution comprising one or more pollutants follows a liquid-film diffusion model. A diffusion model describes how particles (such as atoms, molecules, or ions) move from a region of higher concentration to a lower concentration due to random thermal motion. In some embodiments, the liquid-film diffusion (LFD) constant is in the range of from 0.01 to about 0.1 $min^{-1}$, preferably 0.02 to 0.09 $min^{-1}$, preferably 0.03 to 0.08 $min^{-1}$, and preferably 0.04 to 0.07 $min^{-1}$. In some embodiments, the liquid-film diffusion (LFD) constant is in the range of from 0.02 to about 0.05 $min^{-1}$, preferably 0.021 to 0.049 $min^{-1}$, preferably 0.022 to 0.048 $min^{-1}$, preferably 0.023 to 0.047 $min^{-1}$, preferably 0.024 to 0.046 $min^{-1}$, preferably 0.025 to 0.045 $min^{-1}$, and preferably 0.026 to 0.044 min$^{-1}$, In a preferred embodiment, the liquid-film diffusion (LFD) constant is 0.043 min-1.

In some embodiments, the method of contacting the CaV$_2$O$_6$/CaSiO$_3$/g-C$_3$N$_4$ nanocomposite with the solution comprising one or more pollutants follows an intraparticle diffusion (IPD) model. In some embodiments, the IPD constant is in the range of from 2 to about 4 mg g$^{-1}$ min0.5, preferably 2.2 to 3.8 mg g$^{-1}$ min0.5, preferably 2.4 to 3.6 mg g$^{-1}$ min0.5, preferably 2.6 to 3.4 mg g$^{-1}$ min0.5, and preferably 2.8 to 3.2 mg g$^{-1}$ min0.5. In some embodiments, the IPD constant is in the range of from 2.5 to about 3.5 mg g$^{-1}$ min0.5, preferably 2.55 to 3.45 mg g$^{-1}$ min0.5, preferably 2.60 to 3.40 mg g$^{-1}$ min0.5, preferably 2.65 to 3.35 mg g$^{-1}$ min0.5, preferably 2.70 to 3.30 mg g$^{-1}$ min0.5, preferably 2.75 to 3.25 mg g$^{-1}$ min0.5, preferably 2.80 to 3.20 mg g$^{-1}$ min0.5, preferably 2.85 to 3.15 mg g$^{-1}$ min0.5, and preferably 2.90 to 3.10 mg g$^{-1}$ min0.5. In a preferred embodiment, the IPD constant is 2.948 mg g$^{-1}$ min0.5.

In some embodiments, the method of contacting the CaV$_2$O$_6$/CaSiO$_3$/g-C$_3$N$_4$ nanocomposite with the solution including one or more pollutants occurs for 1 to 2 hours (h), preferably 1.1 to 1.9 h, preferably 1.2 to 1.8 h, preferably 1.3 to 1.7 h, and preferably 1.4 to 1.6 h. In a preferred embodiment, the contacting occurs for 1.5 h.

Contacting the contaminated water with the nanocomposite results in adsorption/absorption of the pollutants onto the nanocomposite to form the contaminated nanocomposite. In some embodiments, the method removes at least 70%, preferably at least 75%, preferably at least 80%, preferably at least 85%, and preferably at least 90% of an initial amount of pollutant present in the contaminated water.

EXAMPLES

The following examples demonstrate a method of removing a pollutant from water using a CaV$_2$O$_6$/CaSiO$_3$/g-C$_3$N$_4$ nanocomposite with one or more pollutants. The examples are provided solely for illustration and are not to be construed as limitations of the present disclosure, as many variations thereof are possible without departing from the spirit and scope of the present disclosure.

Example 1: Fabricating the calcium silicate (CaSiO$_3$)

Equal moles of calcium nitrate and sodium metasilicate were dispersed in 100 milliliters (mL) of ethanol: water (1:1) in a 150 mL glass beaker and sonicated for 15 minutes (min). The mixture was transferred to a 200 mL autoclave and then placed in an oven operated at 180 degrees Celsius (° C.) for 2.0 h. The product was dispersed in 500 ml distilled water with an ultrasonic bath for 10 min, filtered via a Buchner system, rinsed with distilled water, and dried at 120° C. for 1.0 h.

Example 2: Fabricating the graphitic-phase carbon nitride (g-C$_3$N$_4$)

About 30.0 grams (g) of urea was placed in a 250 mL porcelain crucible, covered with its porcelain cover, then the hall crucible and cover were raped with three layers of aluminum foil to reduce the urea loss of evaporation. The crucible was heated via a furnace set at 600° C. for 45 min.

Example 3: Fabricating the vanadium oxide (V205)

About 10.0 g of ammonium metavanadate and 10.0 g of xylose were placed in a 500 mL beaker. 100 mL of distilled water was added to the mixture and heated till a clear solution was obtained. 10 mL of concentrated nitric acid was added to the mixture, which was then heated till the carbonization of xylose. The mixture was placed in an oven set at 120° C. for 5.0 h; the black product was milled in a mortar, placed in a 150 mL porcelain dish, and calcined at 550° C. for 3.0 h.

Example 4: Fabricating the CaV$_2$O$_6$/CaSiO$_3$/g-C$_3$N$_4$

An equal mass of CaSiO$_3$, g-C$_3$N$_4$, and V205 was transferred to a mono wave-200 vial (G30), dispersed in 20 mL ethylene glycol monomethyl ether via an ultrasonic bath for 30 min. The vial was closed with its Teflon cover and placed in the Anton-Baar Monowave-200 operated at 180° C. and 5.0 bar pressure for one hour. The product was dispersed in 1 liter (L) of distilled water with an ultrasonic bath for 30 min, filtered via a Buchner system, rinsed with distilled water, and dried at 150° C. for 2.0 h.

Example 5: Characterization

XRD was used to identify the crystalline states in each specimen studied, employing the JDX-8030 X-ray, JEOL, made in Japan. Cu-filtered CuKα radiation (1.5418 Angstrom (A)) powered at 45 kilovolts (kV) and 10 milliampere (mA) was used to run the patterns. The specimens were tested at ambient temperatures ranging from 20-5 to 80°. The sample's surface morphologies were analyzed by TEM-SAED-HRTEM images obtained using a Tecnai-G20 (USA) transmission electron microscope with a 200 kV speed voltage.

The crystallinity and phases identification present in CaV$_2$O$_6$/CaSiO$_3$/g-C$_3$N$_4$ catalyst was analyzed by X-ray diffraction (XRD) and the results are given in FIG. 1. The intense peaks and high intensity values indicate that the powder is highly crystalline. Examination of the diffraction patterns with the standard PDF cards reveals the presence of CaV$_2$O$_6$ as major phase together with CaSiO$_3$, and g-C$_3$N$_4$ as minor phases. The CaV$_2$O$_6$ phase was indexed to the 2θ values of 25.1°, 25.9°, 27.8°, 27.9°, 30.1°, 36.8°, 36.9°, 39.7°, and 49.6°. These diffractions are, respectively, assigned to (201), (100), (−202), (−111), (111), (−311), (400), (003) and (020) plans of the monoclinic phase of CaV$_2$O$_6$ (Reference code No. 01-073-0186). The CaSiO$_3$ phase (COD No. 01-072-2284) was detected at 2θ values of 25.2°, 30.2°, and 41.8°. These diffractions were respectively coming from (002), (120), and (−231). The diffractions related to g-C$_3$N$_4$ were observed at 45.8°, 53.7°, 71.8°, and 79.4° (COD No. 1534042). Minor traces of silicon dioxide (SiO2) were detected at 2θ values of 19.3° and 25.1° (Reference code No. 00-049-0629). No other phases were detected, indicating the successful fabrication of CaV$_2$O$_6$/CaSiO$_3$/g-C$_3$N$_4$.

Figure 2A:
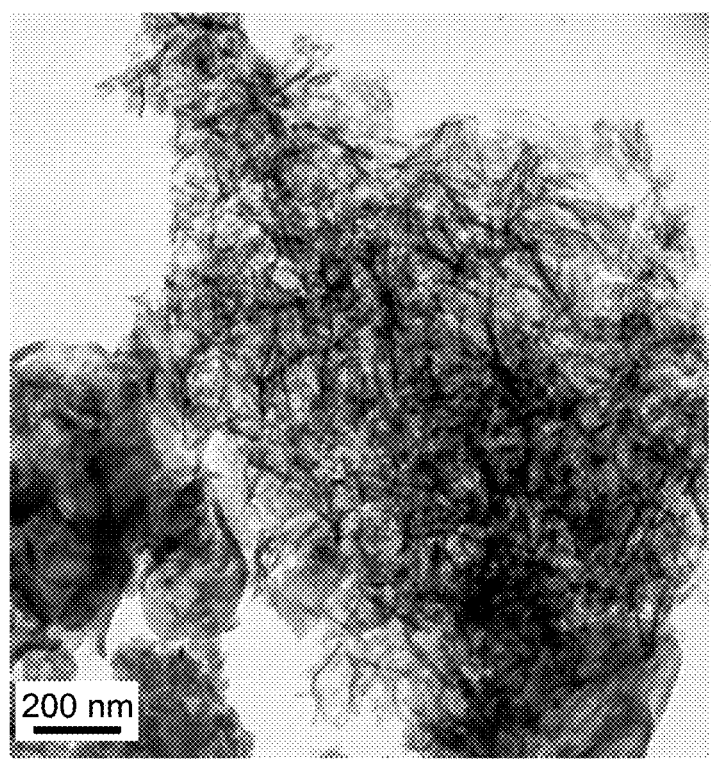
FIG. 2A shows a transmission electron microscopy (TEM) image of the $CaV_2O_6/CaSiO_3/g\text{-}C_3N_4$ nanocomposite, according to certain embodiments.
Figure 2B:
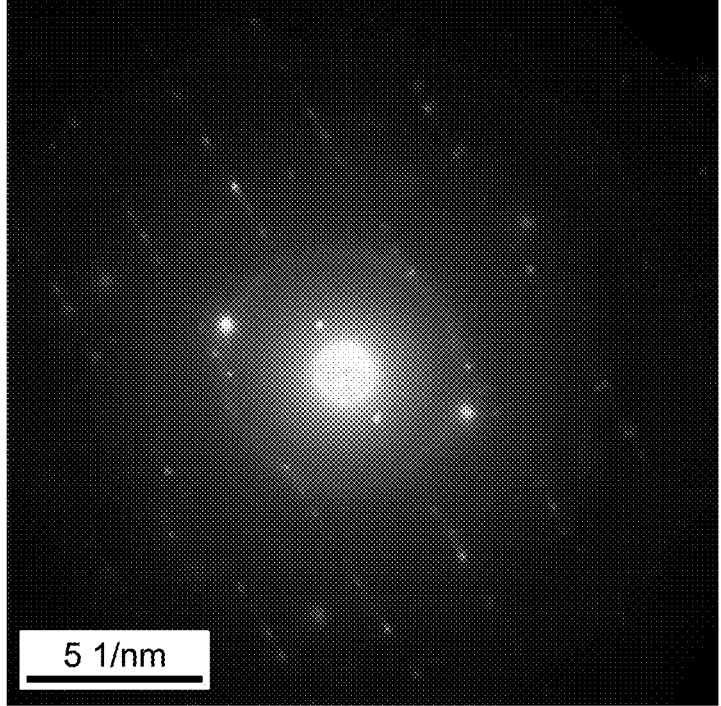
FIG. 2B shows selected area electron diffraction (SAED) pattern of the $CaV_2O_6/CaSiO_3/g\text{-}C_3N_4$ nanocomposite, according to certain embodiments.

Transmission electron microscopy (TEM) images of CaV$_2$O$_6$/CaSiO$_3$/g-C$_3$N$_4$ nanocomposite were presented in FIG. 2. The TEM images showed that a two-dimensional porous structure constructed with curled and wrinkled nanosheets and platelets of the g-C$_3$N$_4$ (FIG. 2). The image also shows well-dispersed homogeneous nanowires of metal oxides with an average length of 90.6 nanometers (nm) on nanosheets of g-C$_3$N$_4$. The corresponding selected area electron diffraction (SAED) pattern reveals diffraction spots with interplanar spacing of 0.23 nm, 0.219 nm, 0.17 nm, and 0.146 nm due to (003, $CaV_2O_6$, (−231, $CaSiO_3$), and (003, $CaV_2O_6$), diffraction planes, respectively, as confirmed from XRD data.

Figure 3A:
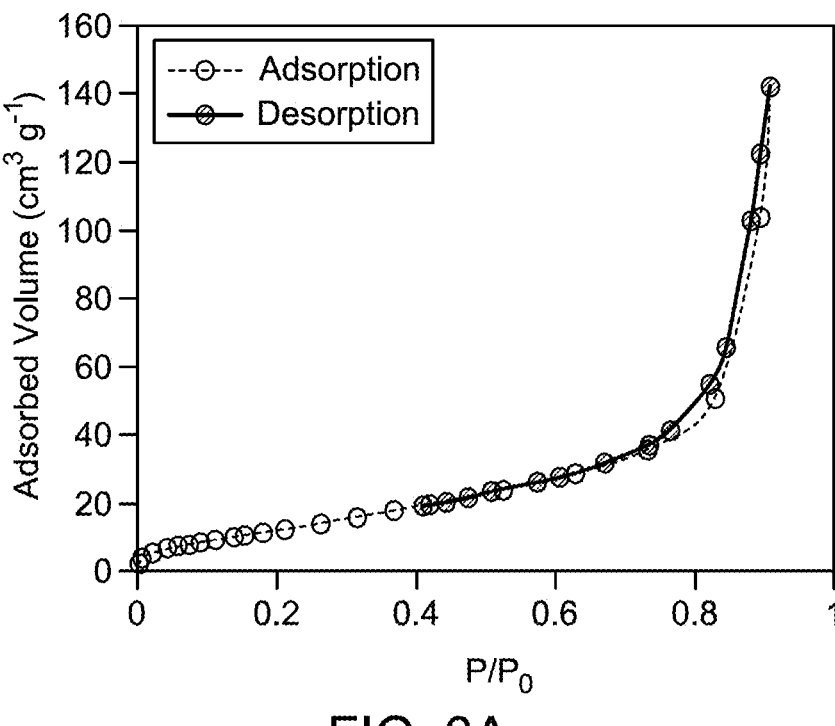
FIG. 3A shows $N_2$ adsorption-desorption isotherms of the $CaV_2O_6/CaSiO_3/g\text{-}C_3N_4$ nanocomposite, according to certain embodiments.
Figure 3B:
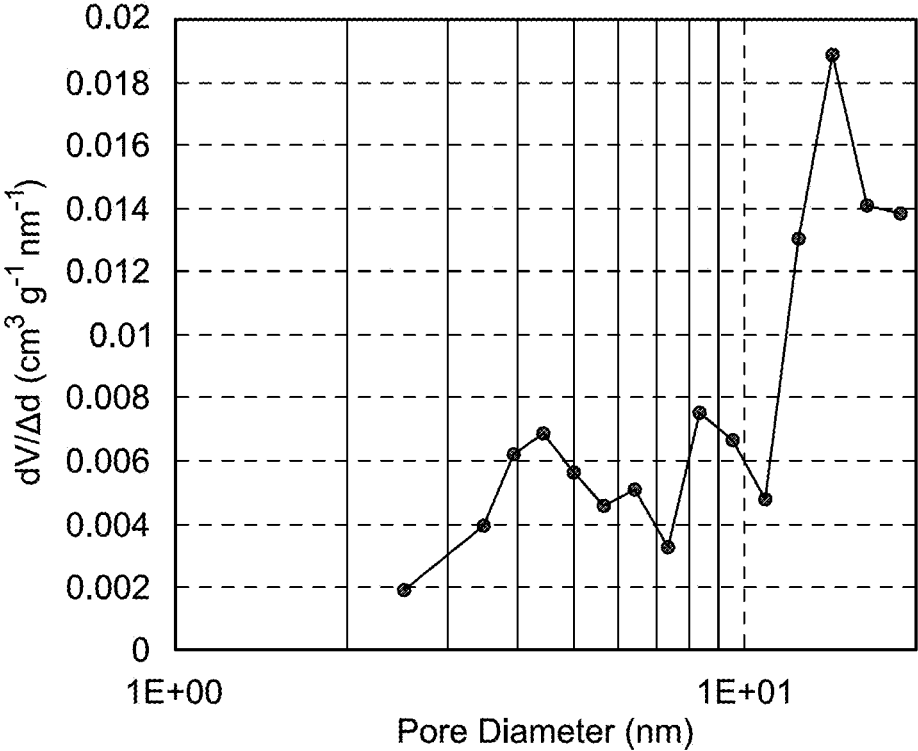
FIG. 3B shows the corresponding pore size distribution of the $CaV_2O_6/CaSiO_3/g\text{-}C_3N_4$ nanocomposite, according to certain embodiments.

FIG. 3 displays the nitrogen adsorption-desorption isotherms of $CaV_2O_6/CaSiO_3/g$-$C_3N_4$ nanocomposite. The nitrogen sorption isotherm of the composite belongs to type IV with a narrow hysteresis loop, indicating the formation of mesoporous structures. However, shifting the loop to a relatively higher pressure ($P/P_0$-0.73-1) indicates the presence of wide mesopores, which may result from the deposition of metal oxide particles in the wide pores of g-$C_3N_4$. Furthermore, the BET surface area of the $CaV_2O_6/CaSiO_3/$ g-$C_3N_4$ sample was calculated to be 57.02 square meters per gram ($m^2g^{-1}$). The marked high specific surface area reflects the good dispersion of these metal oxides nanoparticles on g-$C_3N_4$. and $CaSiO_3$. Moreover, the pore size distribution curves, plotted using the Barrett-Joyner-Halenda (BJH) method, for the $CaV_2O_6/CaSiO_3/g$-$C_3N_4$ sample exhibited trimodal distribution with average pore diameters maximized at 4.3 nm, 8.5 nm, and 14.27 nm and pore volume of 0.22 cubic centimeters per gram ($cm^3g^{-1}$). All the isotherms belong to the category H3 type of pores, which do not exhibit limiting adsorption at high $P/P_0$, and arise due to the aggregation of plate-like particles, giving rise to slit-shaped pores. This indicates that the assembly of $CaV_2O_6/CaSiO_3/$ g-$C_3N_4$ composite provoked a mesoporous array.

0.05g of sorbent was measured in a separate 150 ml beaker. 100 mL of the 100 milligrams per liter (mg $L^{-1}$) BF solution was poured into each beaker. A portion of the mixture was withdrawn till the BF sorption reached the equilibrium. The aliquots were filtered via a 0.22 μm syringe filter, and the absorbance was measured utilizing a UV-Vis-spectrophotometer (λ=550 nm).

The contact time of BF and sorption onto the as-prepared nanocomposite was studied. The BF and absorbance values measured were employed for calculating their remaining concentrations (unadsorbed) at each time interval via Equation 1. Equation 2 was utilized to calculate the adsorption capacity at each period (the BF or milligrams adsorbed onto one gram of sorbent, $q_t$, mg $g^{-1}$).

$$C_t = \frac{Absorbance_{sample}}{Absorbance_{standard}} \times concentration_{standard} \quad (1)$$

$$q_t = \frac{(C_0 - C_t)V}{m} \quad (2)$$

Figure 4:
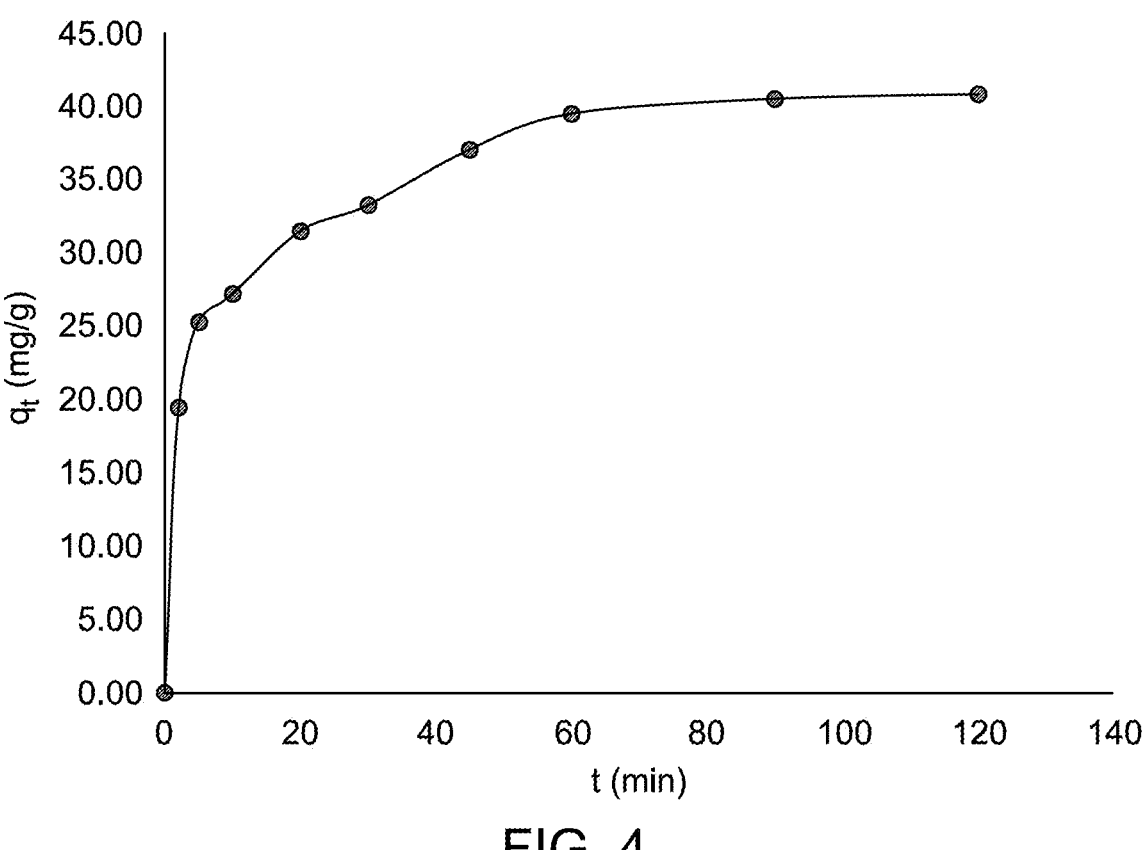
FIG. 4 shows the contact time investigation of basic fuchsin (BF) sorption onto $CaV_2O_6/CaSiO_3/g\text{-}C_3N_4$ nanocomposite, according to certain embodiments.

FIG. 4 demonstrates the adsorption trend of BF onto the prepared nanocomposite. The $CaV_2O_6/CaSiO_3/g$-$C_3N_4$ showed $q_t$ values of 40.8 mg/g; these results reflected the capability of the $CaV_2O_6/CaSiO_3/g$-$C_3N_4$ for treating water contaminated by organic pollutants. Notably, almost 90% of the gained $q_t$ value was acquired within the first 30 min, and the overall sorption processes reached equilibrium within 90 min, presenting the $CaV_2O_6/CaSiO_3/g$-$C_3N_4$ as a fast treatment sorbent.

The adsorption rate order of BF removal by $CaV_2O_6/$ $CaSiO_3/g$-$C_3N_4$ was studied via pseudo-first-order (PF, Equation 3) and pseudo-second-order (PS, Equation 4) kinetic models.

$$\ln(q_e - q_t) = lnq_e - k_1 t \quad (3)$$

$$\frac{1}{q_t} = \frac{1}{k_2 q_e^2 t} + \frac{1}{q_e} \quad (4)$$

Figure 5:
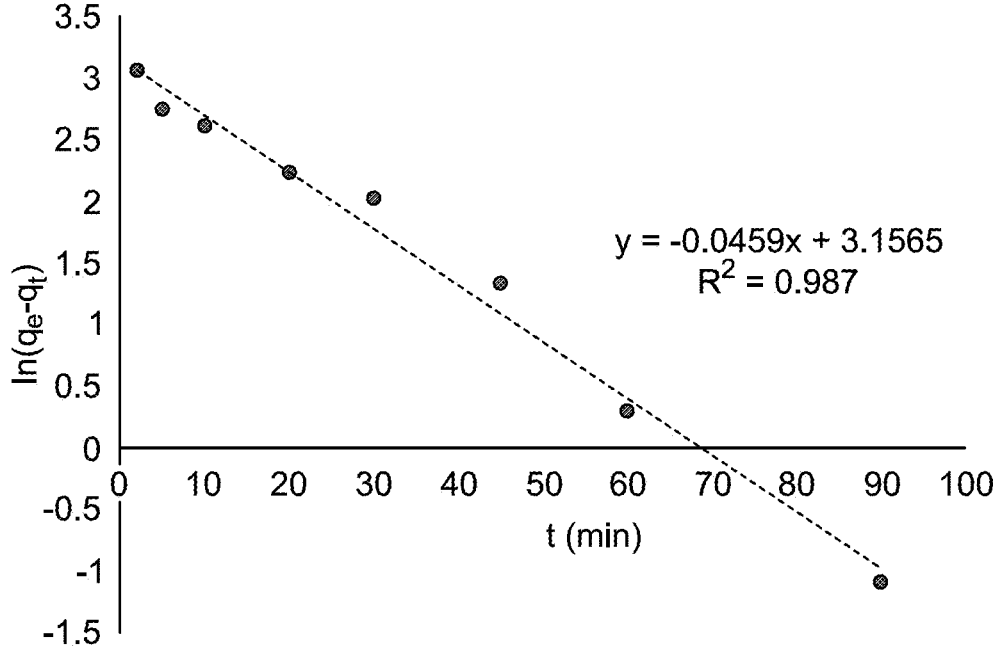
FIG. 5 shows the pseudo-first-order (PF) investigation of BF sorption onto $CaV_2O_6/CaSiO_3/g\text{-}C_3N_4$ nanocomposite, according to certain embodiments.
Figure 6:
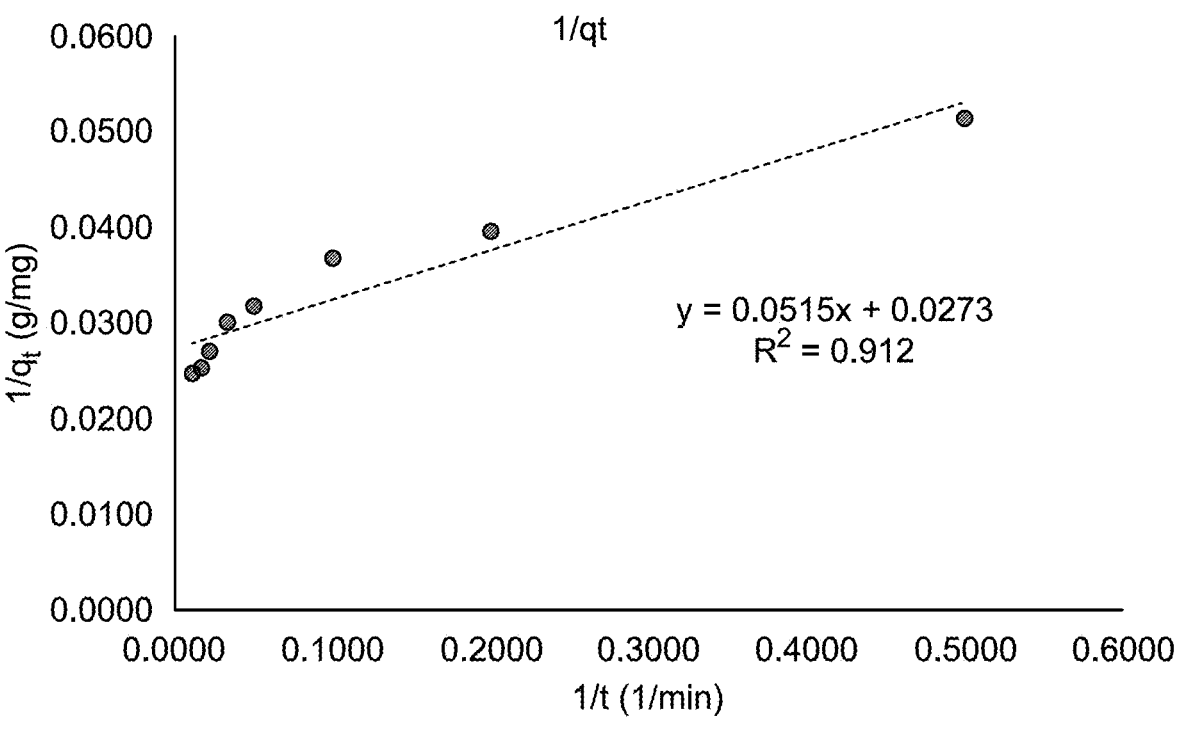
FIG. 6 shows the pseudo-second-order (PS) investigation of BF sorption onto the $CaV_2O_6/CaSiO_3/g\text{-}C_3N_4$ nanocomposite, according to certain embodiments.

The symbol $q_e$ (mg/g) represents the equilibrium adsorption capacity. The PF and PS constants are also time-dependent, with the former represented as k1 ($min^{-1}$) and the latter as k2 (g $mg^{-1}$ $min^{-1}$). The PF plot of the BF adsorption onto $CaV_2O_6/CaSiO_3/g$-$C_3N_4$ nanocomposite is depicted in FIG. 5. Additionally, FIG. 6 illustrates the PS plots of BF sorption onto $CaV_2O_6/CaSiO_3/g$-$C_3N_4$. The rate-order output of BF removal (Table 1) illustrates that the sorption on $CaV_2O_6/CaSiO_3/g$-$C_3N_4$ showed better fitting to the PS model.

The rate-control mechanism of BF removal by $CaV_2O_6/$ $CaSiO_3/g$-$C_3N_4$ was studied using the intraparticle (IPD, Equation 5) and the liquid-film (LFD, Equation 6) diffusion model.

$$q_t = K_{IP} \times t^{1/2} + C_i \quad (5)$$

$$\ln(1-F) = -K_{LF} \times t \quad (6)$$

Figure 7:
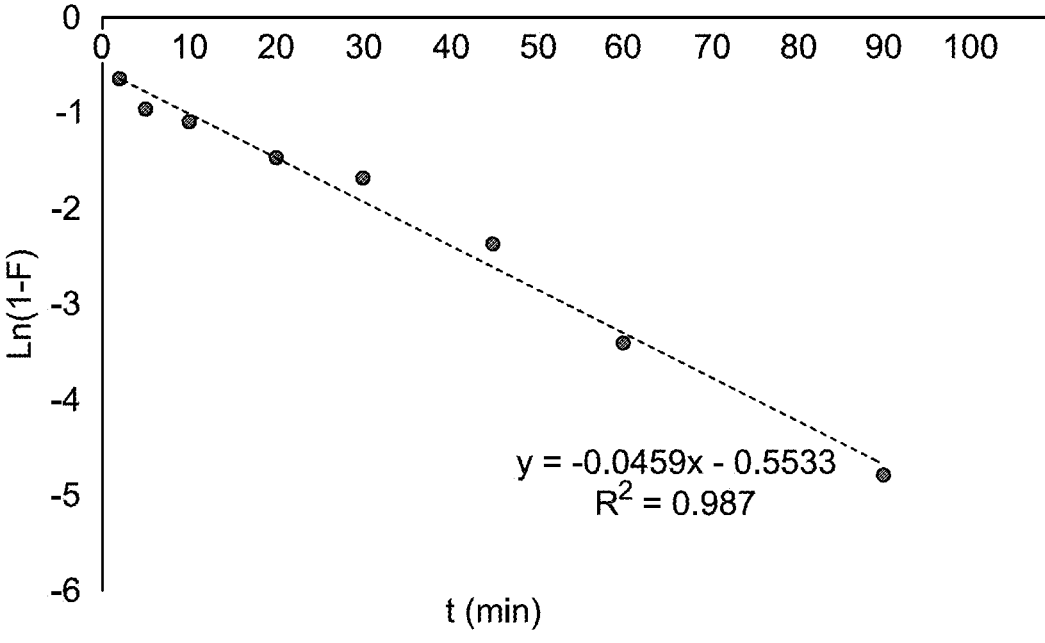
FIG. 7 shows the liquid-film diffusion (LFD) investigation of BF sorption onto the $CaV_2O_6/CaSiO_3/g\text{-}C_3N_4$ nanocomposite, according to certain embodiments.
Figure 8:
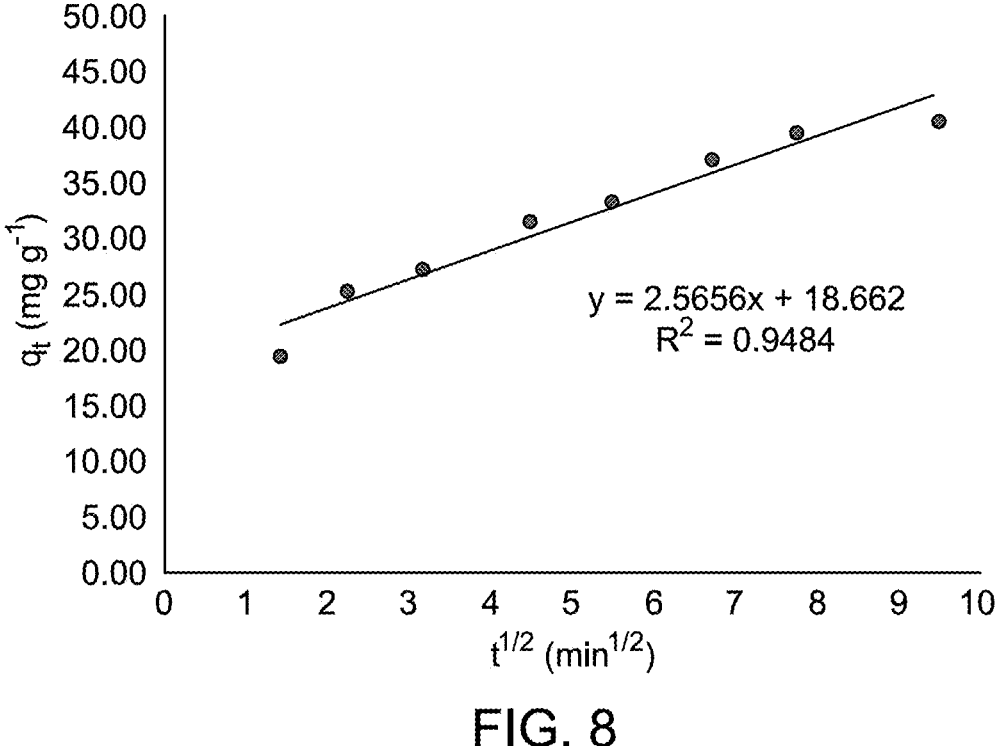
FIG. 8 shows the intraparticle diffusion (IPD) investigation of BF sorption onto the $CaV_2O_6/CaSiO_3/g\text{-}C_3N_4$ nanocomposite, according to certain embodiments.

The IPD constant is denoted by KIPD (mg $g^{-1}$ $min^{-1/2}$), and the LFD constant is designated by $K_{LFD}$ ($min^{-1}$). $C_i$: the boundary layer factor, expressed as milligram per gram (mg $g^{-1}$). The LFD plot of the BF adsorption onto $CaV_2O_6/$ $CaSiO_3/g$-$C_3N_4$ nanocomposite was depicted in FIG. 7. Additionally, FIG. 8 illustrates the IPD plots of BF sorption onto $CaV_2O_6/CaSiO_3/g$-$C_3N_4$. The rate-control output of BF removal (Table 1) illustrated that the LF controlled the sorption on the fabricated $CaV_2O_6/CaSiO_3/g$-$C_3N_4$ nanocomposite.

TABLE 1

The adsorption rate order and rate control results of BF removal by $CaV_2O_6/CaSiO_3/g$—$C_3N_4$

| | PFO | | | | PSO | | |
|---|---|---|---|---|---|---|---|
| $q_e$ exp. (mg $g^{-1}$) | $q_e$ cal. (mg $g^{-1}$) | $R^2$ | $k_1$ | | $q_e$ cal. (mg $g^{-1}$) | $R^2$ | $k_2$ |
| 40.84 | 8.92 | 0.987 | 0.046 | | 36.620 | 0.9120 | 0.014 |

| LFDM | | IPDM | |
|---|---|---|---|
| $K_{LF}$ ($min^{-1}$) | $R^2$ | $K_{IP}$ (mg $g^{-1}$ $min^{0.5}$) | $R^2$ |
| 0.043 | 0.987 | 2.948 | 0.948 |

Numerous modifications and variations of the present disclosure are possible in light of the above teachings. It is therefore to be understood that within the scope of the appended claims, the invention may be practiced otherwise than as specifically described herein.

The invention claimed is:

1. A method of removing a pollutant from water, comprising:

contacting a $CaV_2O_6/CaSiO_3/g$-$C_3N_4$ nanocomposite with a solution comprising one or more pollutants to adsorb at least a portion of the one or more pollutants, wherein the $CaV_2O_6/CaSiO_3/g$-$C_3N_4$ nanocomposite comprises a graphite-phase carbon nitride (g-$C_3N_4$) in an amount of 20 to 40 percent by weight (wt. %), calcium silicate ($CaSiO_3$) in an amount of 20 to 40 wt. %, and calcium metavanadate ($CaV_2O_6$) in an amount of 20 to 40 wt. %, based on a total weight of the $CaV_2O_6/CaSiO_3/g$-$C_3N_4$ nanocomposite.

2. The method of claim 1, wherein the $CaV_2O_6/CaSiO_3/$ g-$C_3N_4$ nanocomposite is porous, and has a slit-shaped pores.

3. The method of claim 1, wherein the $CaV_2O_6/CaSiO_3/g-C_3N_4$ nanocomposite is porous, and has an average pore diameter of 3 to 15 nm.

4. The method of claim 1, wherein the $CaV_2O_6/CaSiO_3/g-C_3N_4$ nanocomposite is porous, and has a pore volume of 0.2 to 0.25 cubic centimeters per gram ($cm^3g^{-1}$).

5. The method of claim 1, wherein the $CaV_2O_6/CaSiO_3/g-C_3N_4$ nanocomposite has a Brunauer-Emmett-Teller (BET) surface area of 50 to 65 square meter per gram ($m^2g^{-1}$).

6. The method of claim 1, wherein the one or more pollutants are present on a surface and/or in pores of the nanocomposite after the contacting.

7. The method of claim 1, wherein the $CaV_2O_6/CaSiO_3/g-C_3N_4$ nanocomposite has an adsorption capacity of 35 to 45 milligrams (mg) of the one or more pollutants per gram of the $CaV_2O_6/CaSiO_3/g-C_3N_4$ nanocomposite.

8. The method of claim 1, wherein during the contacting, the $CaV_2O_6/CaSiO_3/g-C_3N_4$ nanocomposite removes at least 18 mg of the one or more pollutants per gram of the nanocomposite from the solution within 3 minutes.

9. The method of claim 1, wherein during the contacting, the $CaV_2O_6/CaSiO_3/g-C_3N_4$ nanocomposite removes at least 25 mg of the one or more pollutants per gram of the nanocomposite from the solution within 5 minutes.

10. The method of claim 1, wherein during the contacting, the $CaV_2O_6/CaSiO_3/g-C_3N_4$ nanocomposite removes at least 27 mg of the one or more pollutants per gram of the nanocomposite from the solution within 10 minutes.

11. The method of claim 1, wherein during the contacting, the $CaV_2O_6/CaSiO_3/g-C_3N_4$ nanocomposite removes at least 30 mg of the one or more pollutants per gram of the nanocomposite from the solution within 20 minutes.

12. The method of claim 1, wherein during the contacting, the $CaV_2O_6/CaSiO_3/g-C_3N_4$ nanocomposite removes at least 33 mg of the one or more pollutants per gram of the nanocomposite from the solution within 30 minutes.

13. The method of claim 1, wherein during the contacting, the $CaV_2O_6/CaSiO_3/g-C_3N_4$ nanocomposite removes at least 35 mg of the one or more pollutants per gram of the nanocomposite from the solution within 45 minutes.

14. The method of claim 1, wherein during the contacting, the $CaV_2O_6/CaSiO_3/g-C_3N_4$ nanocomposite removes at least 38 mg of the one or more pollutants per gram of the nanocomposite from the solution within 60 minutes.

15. The method of claim 1, wherein during the contacting, the $CaV_2O_6/CaSiO_3/g-C_3N_4$ nanocomposite removes at least 40 mg of the one or more pollutants per gram of the nanocomposite from the solution within 90 minutes.

16. The method of claim 1, wherein the $CaV_2O_6/CaSiO_3/g-C_3N_4$ nanocomposite has a morphology comprising:

a homogeneous mixture of $CaV_2O_6$ and $CaSiO_3$ in the form of nanowires; and $g-C_3N_4$ in the form of nanosheets, wherein the nanowires are distributed between the nanosheets.

17. The method of claim 1, wherein the contacting has a pseudo-second order kinetic model.

18. The method of claim 1, wherein the contacting has an intraparticle diffusion model, and/or a liquid-film diffusion model.

19. The method of claim 1, wherein the contacting occurs for 1 to 2 hours.

20. The method of claim 1, wherein the one or more pollutants comprise at least one organic pollutant.

* * * * *